May 12, 1953 J. E. WHITAKER 2,638,398

HOLDER FOR A TELEPHONE AND TELEPHONE DIRECTORY

Filed July 2, 1951

J. E. Whitaker
INVENTOR,

BY C.A. Snow & Co.
ATTORNEYS.

Patented May 12, 1953 2,638,398

UNITED STATES PATENT OFFICE 2,638,398

HOLDER FOR A TELEPHONE AND TELEPHONE DIRECTORY

John E. Whitaker, Monroe, La.

Application July 2, 1951, Serial No. 234,744

1 Claim. (Cl. 312—233)

This invention relates to a holder or shelf for a telephone and telephone directory. More particularly the invention has reference to a support or shelf of the type stated adapted for mounting either upon a wall or other vertical supporting surface, or for location upon a horizontal surface such as a table or desk.

It is a source of considerable inconvenience and annoyance to persons engaged in business or other persons having need for frequent use of a telephone, to be faced with the necessity of locating a telephone number in the directory, holding the book open while dialing the number, and referring alternately to the dial of the instrument and to the telephone directory to insure that the number is being accurately dialed.

The main object of the present invention, accordingly, is to provide in a compact, unitary device, a support or shelf for a telephone and telephone directory so designed as to permit the telephone directory to be conveniently accessible when one desires to locate a number, permit the directory to be positioned at a convenient angle while the number is being searched, and hold the telephone and directory in such positions, relative to each other, as to permit ready inspection of the telephone directory during the dialing of a number.

Another important object is to provide a device of the type stated which can be manufactured at relatively low cost, will be durable, and will occupy little space.

Still another object is to provide a shelf or support of the type stated in which the book or directory-supporting portion thereof can be recessed when not in use, and can be positioned at selected angles of inclination when one is looking up a number.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings.

Figures 1, 2, 3, 4:
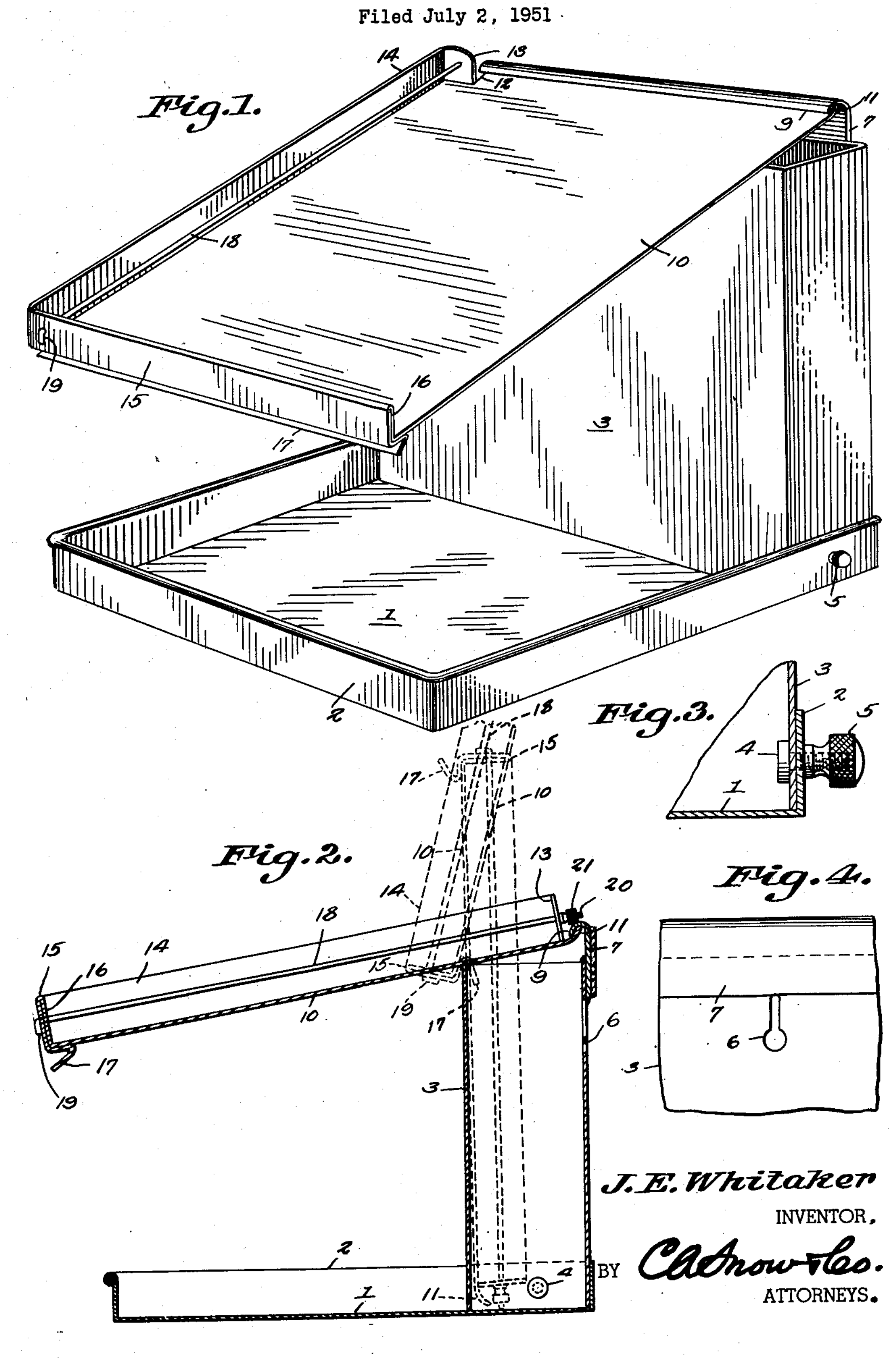
Fig. 1 is a perspective view of a support for a telephone and telephone directory formed in accordance with the present invention.
Fig. 2 is a longitudinal section, the directory-supporting portion being illustrated, in one dotted line position, recessed within its receptacle, in another dotted line position positioned in one selected operative position and in full lines in another selected operative position.
Fig. 3 is an enlarged detail section showing the means for attaching the directory receptacle to the telephone shelf.
Fig. 4 is a fragmentary rear elevational view of the upper end of the receptacle showing the means for mounting the device upon a vertical supporting surface.

Referring to the drawings in detail, the entire device can be conveniently formed from sheet metal or similar material, and includes a telephone shelf 1 of flat, rectangular formation, provided throughout its periphery with an upstanding retaining flange 2 to prevent the instrument, not shown, from slipping off the shelf, the shelf having a rolled edge.

At the rear end of and within the confines of the telephone shelf 1, I mount an upstanding directory receptacle 3 formed open at opposite ends and rectangular in cross section.

During shipment of the device by a manufacturer, the receptacle 3 can be laid flat within the telephone shelf 1. However, when the device is assembled for use, screws 4 are outwardly extended through the opposite side walls of the receptacle 3, and extend through openings formed in the peripheral flange 2 of the telephone shelf, said openings registering with the screw-receiving openings of the telephone directory receptacle. Knurled cap nuts 5 or the like are used to secure the receptacle in position, said cap nuts being threaded upon the screws 4 as readily seen from Fig. 3.

Formed in the rear wall of the receptacle 3, adjacent the upper end of the receptacle, is a buttonhole slot 6 adapted to receive a screw, nail, or the like, not shown, projecting from a wall or similar supporting surface whereby to suspend the entire device upon the wall. It will be understood, in this connection, that the device is equally well adapted for being supported directly upon a horizontal surface such as a table or desk in which event the buttonhole slot would not be used.

Secured to the upper edge of the rear wall of the receptacle 3 is a felt covered upper extension 7, connected to the rear wall by a weld 8 or equivalent fastening means, said extension 7 being formed from a flat piece of metal material and extending from side to side of the receptacle. The upper edge of the extension 7 is provided with a forwardly turned lip 9, adapted to engage one end of a directory shelf 10 formed from a flat, substantially rectangular piece of sheet metal or the like. The rear edge of the directory shelf is upturned as at 11 for engagement under the lip 9.

At the rear end of the directory shelf, adjacent one side, the directory shelf is cut inwardly as at 12 and the material freed by so doing is upturned as at 13 and rigidly secured in any suitable manner to an upstanding side flange 14 of the directory shelf, the other end of the side flange 14 being secured to one end of a front flange 15 folded over upon itself as at 16 and terminating under the directory shelf 10 in a depending offset supporting lip 17.

The front flange 15 and rear tab 13 are formed, adjacent one side edge of the directory shelf 10, with registering bearing openings receiving opposite ends of a rod 18. The front end of the rod is provided with a downturned end 19, while the other end of the rod is threaded as at 20 and receives a knurled nut 21. Thus the rod 18 is removably mounted upon the directory shelf 10 and can be removed whenever desired to mount upon the directory shelf a new telephone directory. It will be understood that the rod 18 passes through the telephone directory to hold it in place.

Referring to Fig. 2, three positions of the directory shelf are there illustrated. Normally, when the directory is not being used, it is in the lower dotted line position illustrated in Fig. 2, in which position it is deposited within the directory receptacle 3.

In one operative position, the directory shelf is pulled upwardly from the receptacle 3, and the upturned end 11 engaged under the lip 9 of the receptacle, the front wall of the receptacle supporting the rear end portion of the directory shelf to hold the shelf in the full line position illustrated in Fig. 2. In this position of the directory shelf, the directory can be conveniently used for looking up telephone numbers, and at the same time, the telephone instrument, not shown, supported upon the telephone shelf 1, is available for dialing purposes and for regular use. The user can conveniently refer back to the telephone directory during the dialing if necessary.

If desired, the telephone directory shelf can be placed in another position, the upper dotted line position illustrated in Fig. 2. In this position the flange 17 is supported upon the top edge of the front wall of the receptacle 3, with the directory holder 10 extending upwardly and at an incline from said receptacle, so that the upper end of the directory holder may be supported against a vertical wall or similar supporting surface.

It will be understood that the structure which I have devised can be used without the shelf 1, where the shelf is not needed to support a telephone instrument, this being particularly true in some homes, where a built-in booth or shelf is provided for the instrument. In such cases, of course, the telephone directory holder and receptacle would still be used.

What is claimed is:

A telephone and telephone directory support comprising a substantially horizontally disposed shallow rectangular tray forming a telephone instrument support, an elongated hollow substantially rectangular body carried by the tray and extending upwardly therefrom adjacent one marginal edge thereof, said body having an open upper end for admitting a telephone directory edgewise into the body, an extension carried by the wall of the body adjacent the adjacent marginal edge of the tray and projecting upwardly from the body adjacent the open upper end thereof, a flange carried by the extension and projecting over the body in spaced relation to the upper end thereof, a substantially rectangular telephone book supporting panel carried by the body for movement from a substantially vertical position within the body to a position overlying the tray, and a lip carried by the panel and projecting outwardly therefrom adjacent one marginal edge thereof for engaging the flange and holding the panel in spaced relation to the tray and above a telephone instrument thereon.

JOHN E. WHITAKER.

References Cited in the file of this patent

UNITED STATES PATENTS

| Number | Name | Date |
|---|---|---|
| 381,182 | Threlkeld | Apr. 17, 1888 |
| 1,492,455 | Hall | Apr. 29, 1924 |
| 2,084,197 | Grosser | June 15, 1937 |
| 2,586,543 | Kennedy | Feb. 19, 1952 |